United States Patent [19]

Beach, Jr. et al.

[11] Patent Number: 4,531,689
[45] Date of Patent: Jul. 30, 1985

[54] VACUUM PROBE FOR ATTACHING TAPE TO REEL HUB WITHIN A CARTRIDGE

[75] Inventors: Laurence R. Beach, Jr., Tucson, Ariz.; William G. Rance, Jr., West Palm Beach, Fla.; Paul H. Whittington; William O. Wightman, Jr., both of Tucson, Ariz.

[73] Assignee: International Business Machines Corporation, Armonk, N.Y.

[21] Appl. No.: 626,947

[22] Filed: Jul. 2, 1984

[51] Int. Cl.³ .......................... G03B 1/04; G11B 15/32
[52] U.S. Cl. .................................... 242/195; 242/197; 226/91; 226/95
[58] Field of Search ............... 242/56 R, 76, 195, 197; 226/91, 95, 97; 156/507, 508

[56] References Cited

U.S. PATENT DOCUMENTS

| | | | |
|---|---|---|---|
| 3,372,884 | 3/1968 | Nagano | 242/181 |
| 3,643,889 | 2/1972 | Krause | 242/182 |
| 3,712,558 | 1/1973 | Johnson et al. | 242/195 |

Primary Examiner—Leonard D. Christian
Attorney, Agent, or Firm—James M. Thomson

[57] ABSTRACT

In a tape winding machine, a vacuum probe assembly for attaching one end of a section of tape to an adhesive patch oriented on the periphery of a reel mounted within a cartridge, and means for winding the tape on the reel, severing the tape an reattaching the trailing end to the vacuum probe for subsequent adherence to the reel of the next cartridge.

5 Claims, 6 Drawing Figures

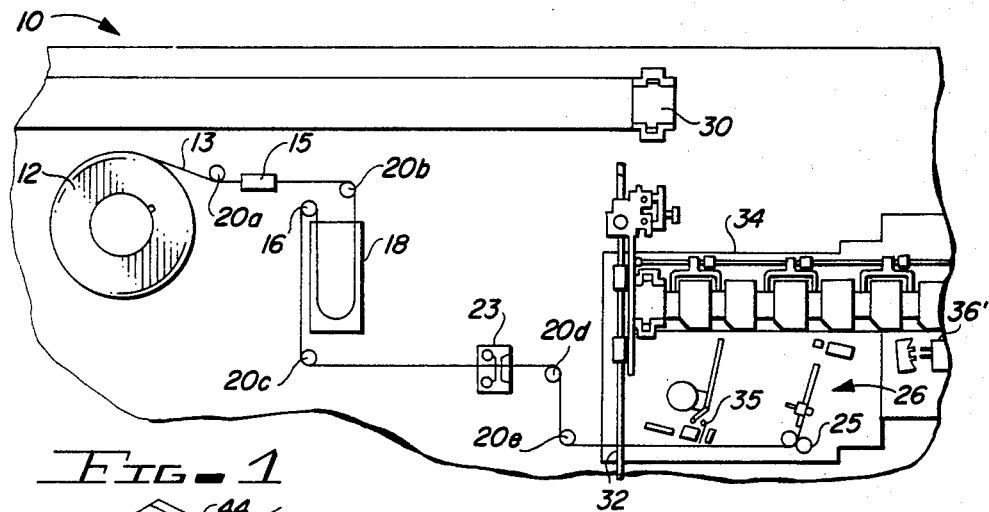
FIG-1
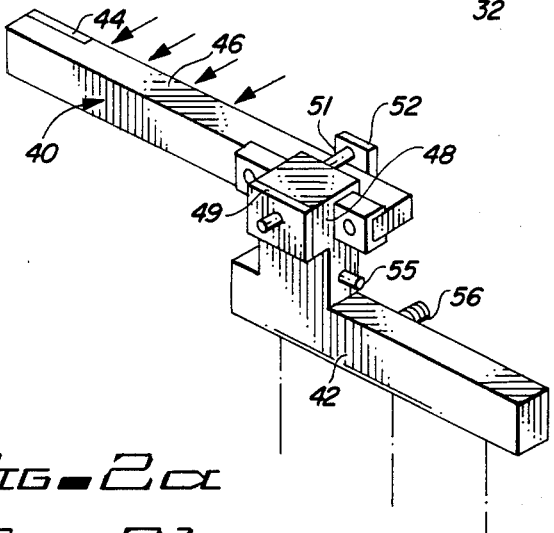
FIG-2a
FIG-2b
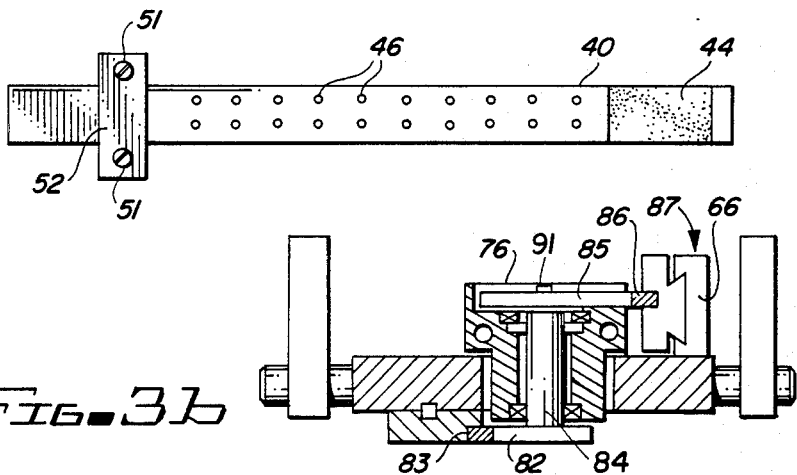
FIG-3b

VACUUM PROBE FOR ATTACHING TAPE TO REEL HUB WITHIN A CARTRIDGE

BACKGROUND OF THE INVENTION

The present invention relates to tape winding apparatus. More particularly, the invention concerns a vacuum probe within a tape winding machine for successively attaching a free end of tape from a tape supply to the periphery of a reel within a cartridge to permit continuous winding of tape on a successive line of cartridges.

DISCUSSION OF THE PRIOR ART

Various winding apparatus are known in the prior art for continuously winding film onto rolls. U.S. Pat. Nos. 3,942,796; 3,430,881; 3,505,150; 3,552,670 all describe web winding apparatus of various configurations. The apparatus described in the aforementioned patents share a common characteristic in that they are adapted to wind tape or paper upon exposed reels. Such operations may be satisfactory for many purposes. However, with respect to magnetic tape such as that utilized in recording applications, the problem of contamination of the tape is found to be significant if the tape is wound upon reels prior to being placed within a cartridge. Accordingly, it would be of extreme advantage to perform winding operations upon a reel after it is placed within a cartridge whereby the winding operation might be carried out in an essentially close environment with a more carefully controlled level of contamination.

Accordingly, a need exists in the art for a winding machine which includes means for attaching the free end of a section of tape to a reel located within a cartridge, whereby winding of the tape upon the reel can be carried out after the reel is assembled within the cartridge.

SUMMARY OF THE INVENTION

Accordingly, it is an object of the invention to provide within a tape winding machine, a vacuum probe for selectively attaching an end of section of tape to an adhesive patch positioned on a reel located within a cartridge whereby the necessary tape winding operation can be carried out within the cartridge.

This object and other features of the invention are attained in a winding machine for winding film on a reel located within a cartridge, including a probe subassembly that includes vacuum means for retaining an end section of the film against a resilient insert in the face of the probe, a drive for advancing the probe through a corner opening of the cartridge at an angle that permits clearance of the reel to a position beyond the tangent point of the reel diameter, another drive to move the probe laterally until the resilient insert causes the end of the film to adhere to an adhesive patch previously placed upon the reel periphery, and control means for releasing vacuum pressure as the probe is withdrawn from the cartridge. Following such operations, the film is wound upon the reel to a preferred diameter after which the film is severed with the leading edge being positively controlled to be readhered to the probe end, permitting subsequent attachment to the reel of the next cartridge in the process line.

BRIEF DESCRIPTION OF THE DRAWINGS

The above and other features and advantages of the invention are described in the following detailed description, taken in conjunction with the drawings wherein:

FIG. 1 is a schematic representation of the subassembly illustrating its cooperation with the winding apparatus;

FIG. 2a is a detailed drawing of the probe apparatus;

FIG. 2b is a detailed view of the face of the probe;

FIG. 3b is a cross-sectional view of the gear box illustrated in FIG. 3a;

DETAILED DESCRIPTION OF THE INVENTION

Figure 3A:
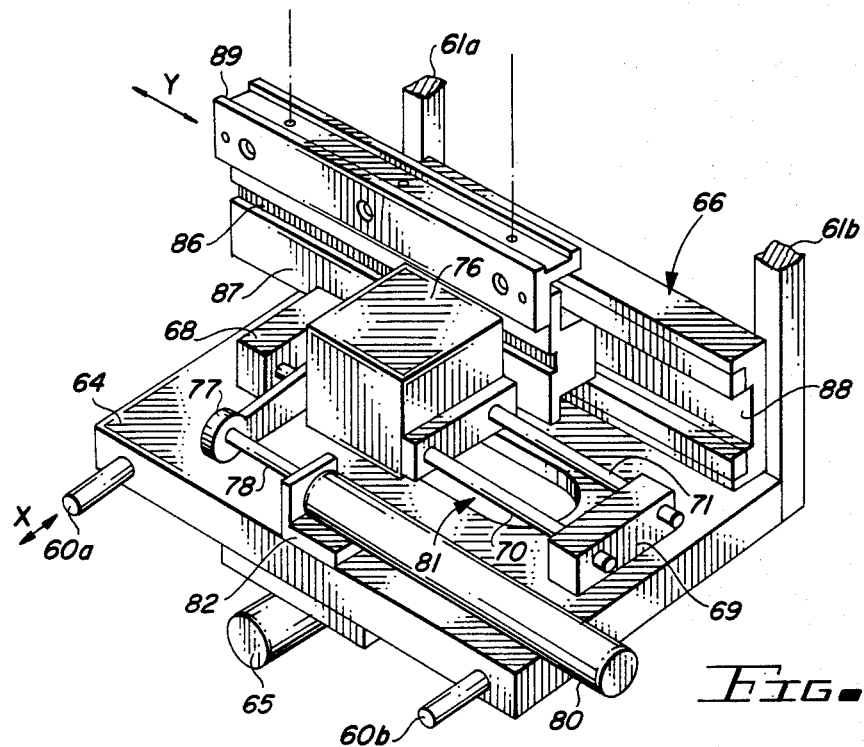
FIG. 3a is a detailed drawing of the drive mechanism for the probe apparatus.

Referring now to the drawings and particularly to FIG. 1, a preferred embodiment of the invention is illustrated. FIG. 1 shows the general layout of an automatic winding machine. It should be recognized that the winding apparatus could be a single spindle or a multiple spindle apparatus, with the winding layout illustrated and FIG. 1 being merely one of several lines determining product flow. The line illustrated generally includes a supply reel 12 adapted to supply tape along a path labeled 13 in a continuous fashion. A splicer 15 is provided along with a tachometer 16 that operates in conjunction with a vacuum column 18 to provide a predetermined tension to the tape path. Rollers indicated by numerals 20a-e are utilized to define the tape path. A cleaning mechanism 23 is also provided in the tape path.

A pinch roller set 25 is provided at the base of an attach and wind station 26 which subassembly comprises an apparatus described in detail hereinafter. The line otherwise includes a cartridge input station 30 and a vertical cartridge move mechanism 32 which operates to provide cartridges to a horizontal cartridge mover indicated by numeral 34. The horizontal cartridge mover moves cartridges from left to right as shown in FIG. 1 and after passing a number of operating stations, the cartridges are retrieved by a similar vertical cartridge mover and cartridge output station, not illustrated. The line otherwise generally includes a cartridge adhesive apply station indicated by numeral 35 and includes a leader block attach station 36. The general operation of the winding apparatus serves to supply tape in a continuous flow from supply reel 1 under a predetermined tension. Cartridges are fed through the cartridge input and vertical cartridge mover whereby a continuous supply of cartridges is accepted by the horizontal cartridge mover and translated left to right in FIG. 1 past an adhesive apply station, a tape attach and wind station, a leader block attach station and eventually to another vertical cartridge mover which serves to remove the cartridges and supply them to a cartridge output station.

Referring to FIG. 2, the details of the film attach probe extension are illustrated. The probe includes an elongate extension member 40 which includes internal vacuum channels that communicate with a vacuum manifold 42 to which extension 40 is attached. The face of extension 40 is provided with an insert 44 of porous resilient material such as polyurethane and it is also provided with a number of openings 46 arranged in a regular pattern whereby a strip of film or tape can be adhered to the face of the insert by vacuum pressure.

An air operated clamp 48 is illustrated at the upper half of manifold 42. The clamp includes a cylinder housing generally indicated at 49 wherein two movable pistons 51 are retained. A clamp member 52 is secured between the pistons. A conventional cylinder mechanism, serves to move the clamp between a closed position wherein it retains film against the extension and an open position wherein it permits film to pass along the extension during a winding operation. FIG. 2 otherwise illustrates a pressure line fitting 55 adapted to be connected to external air pressure supply and a vacuum line fitting 56 adapted to be connected to an external vacuum supply.

Figure 4:
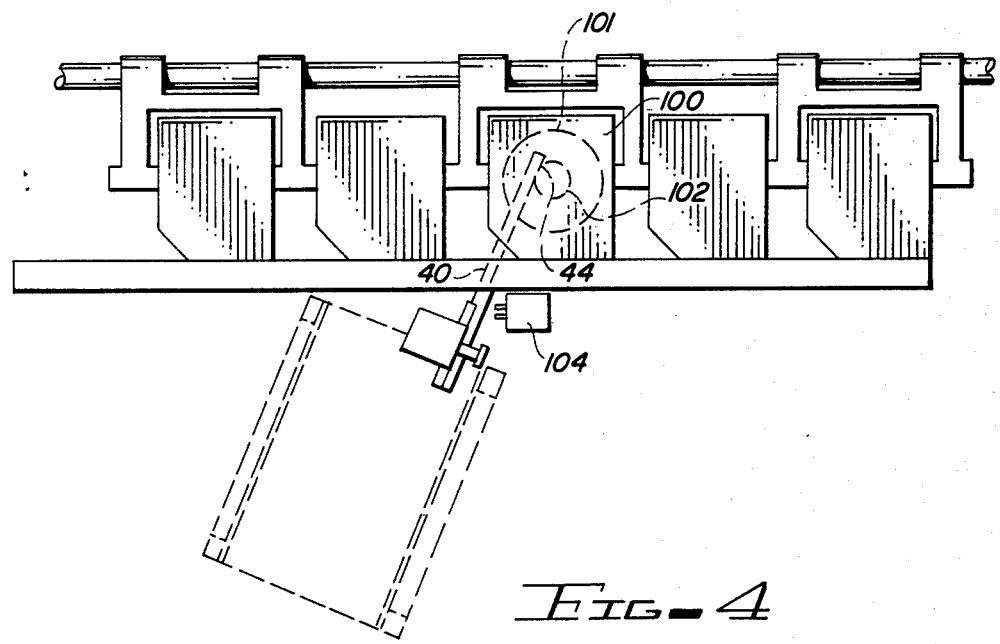
FIG. 4 is a layout drawing showing the position of the probe in inserted state.

FIG. 3 illustrates a drive mechanism for supporting and moving the extension in X and Y directions. The drive mechanism includes a pair of X axis support rods 60a and 60b attached at either end to fixed supports 61a-d, two of which are illustrated. The fixed supports are adapted to be secured to the winder frame locating the drive mechanism and extension at the desired orientation with respect to cartridges as is generally illustrated in FIG. 4. A platform 64 having openings therein for members 60a, 60b is mounted for X axis translation with respect thereto. An X axis cylinder 65 is provided having its base attached to platform 64 and its piston end attached to a member extending between supports 61a, 61b. Thus, operation of the cylinder serves to translate platform 64 back and forth along the X axis.

Platform 64 serves as the support for a guide mechanism 66 and brackets 68, 69 which support Y guide rods 70, 71. Guide rods 70, 71 support a gear box 76 which is attached via a bracket 77 to the piston 78 of a Y axis cylinder 80 having its body attached via bracket 82 to platform 64. Thus, operation of cylinder 80 will translate the gear box in a Y direction.

Gear box 76 retains a pinion 82 adapted to extend through opening 81 formed in platform 64. The pinion engages a corresponding rack 83 formed on the edge of platform 64 whereby the pinion is rotated as the gear box is driven in the Y direction. The pinion is mounted on a vertical shaft 84 which is also secured by suitable means such as bolt 91 to another pinion 85 that engages a rack 86 on slide 87. As shown, slide 87 is retained within a channel 88 formed in member 66 by an extension support 89 to which the probe extension (not illustrated) is secured.

Therefore, as cylinder 80 operates in the Y direction, the gear box provides a three to one gear ratio that moves the extension laterally along the Y direction through a previously determined motion described herein.

Referring to FIG. 4, the orientation of the attach probe extension 40 with respect to the cartridge is illustrated. FIG. 4 shows an extended position of the attach probe wherein the probe is inserted through a corner opening of the cartridge at an angle of about 10 degrees with respect to the vertical edge of the cartridge. This permits clearance between the extension of the probe and the cartridge opening, and it also permits the probe to extend past the inner periphery 102 of the reel 101 which is illustrated in dotted outline within cartridge 100, for example. The length of the probe is selected so that the resilient end member when extended moves slightly past a tangential position with respect to the center of the reel. The probe extension is located about one-quarter inch away from the reel hub at this point. Motion to place the reel probe in this position is attained through movement of the Y axis cylinder 80 under computer controlled operation.

Translation of the X axis cylinder 65 is used to move the probe between the insert position wherein it clears the cartridge reel and the attach position wherein the resilient portion is brought into firm contact with the wheel periphery. After attach, the extension is completely withdrawn from the cartridge by operation of cylinder 80 in the opposite direction.

The operation of the probe is explained hereinafter with the probe extension in a retracted position with the tape severed just above the end of the probe, and with an unwound cartridge presented to the attach and wind station. The probe is advanced by cylinder 80 with a length of tape adhered thereto by vacuum force and by means of clamp 52. With the probe extension inserted fully into the cartridge, the cylinder 65 is actuated to move the probe in the X direction until the resilient face of the probe extension conforms to the periphery of the adhesive layer on the reel hub. Sufficient force is applied to adhere the end of the tape to the adhesive and reel hub. Cylinder 65 is then reversed moving the extension away from the reel hub. The porosity of the resilient insert permits the tape to adhere to the reel without turning off the vacuum supply. A vacuum sensing element provides an indication whether positive attach was achieved. In the event attach was achieved, then the vacuum supply is turned off, clamp 52 is opened and the probe is withdrawn whereby a winding operation can commence.

In the event that positive attach is not achieved, then the cylinder 65 is moved back into the attach position whereby a retry attempt is made to achieve attach of the tape to the reel hub. In the event that a second or third retry is not successful, then an indication can be provided via the controller operation for an operator to intervene.

Assuming positive attach is achieved and the probe withdrawn, then a winding operation commences whereby the reel is wound to a predetermined diameter with the probe in a withdrawn position. Upon achievement of the desired diameter, cutters 104 are rotated into the tape path and vacuum is again applied to the probe extension to secure the tape firmly to the extension. Clamp 52 is also moved to a closed or retaining position. The cutters are subsequently actuated to sever the tape just above the probe end with the supply end being retained on the extension and the trailing end being left free with the cartridge reel.

Upon completion of the winding and severing operation, the horizontal transport is actuated to move the cartridge with the wound reel to the next station and to present a new cartridge to the attach station whereby the operational cycle can be repeated. The apparatus described is particularly advantageous in that it is compact due to the use of a three to one drive ratio in the Y axis and in that it utilizes an extension mounting angle with respect to the cartridge that permits extension of the cartridge through the corner opening without impacting the reel or the cartridge housing. The apparatus otherwise enables the retention of positive control over the tape at all times whereby automatic winding of cartridges in seriatim is possible.

What is claimed is:

1. In a machine for automatically winding tape on a reel mounted within a substantially closed cartridge,
a probe assembly for selectively attaching an end section of the tape to an adhesive layer on the reel hub including an extension having vacuum means therein for retaining the tape and a resilient end portion for selectively engaging the hub of the reel to adhere the tape to the adhesive layer, first drive means for selectively extending the extension from a first position wherein it is withdrawn from the cartridge to a second position where it is inserted within a corner opening of the cartridge, and second drive means for selectively moving the extension laterally to cause the resilient end portion of the extension to engage and conform to the periphery of the reel hub thereby forcing the tape held thereon into firm engagement with the adhesive layer on the reel hub.

2. The apparatus of claim 1 wherein the resilient end portion of the extension is sufficiently porous to permit transmission of vacuum pressure.

3. The apparatus of claim 1 wherein the first drive means orients the extension at about a 10 degree angle with respect to the vertically oriented edge of the cartridge shell.

4. The apparatus of claim 1 wherein said extension further includes clamp means for holding the tape into firm contact with the extension during movement of the extension.

5. The apparatus of claim 4 wherein said first drive means comprises a rack and pinion having at least a three to one drive ratio whereby relatively small movement of the housing assembly results in relatively greater movement of said extension.

* * * * *